No. 709,792. Patented Sept. 23, 1902.
G. W. McFATRICH.
EDUCATIONAL OPTICAL INSTRUMENT.
(Application filed Apr. 16, 1902.)

(No Model.) 2 Sheets—Sheet 1.

Witnesses: Inventor:
George W. McFatrich
By Luther L. Miller
Atty.

No. 709,792. Patented Sept. 23, 1902.
G. W. McFATRICH.
EDUCATIONAL OPTICAL INSTRUMENT.
(Application filed Apr. 16, 1902.)

(No Model.) 2 Sheets—Sheet 2.

Witnesses:
Harved G. Barritt,
Geo. L. Chindahl

Inventor:
George W. McFatrich
By Luther L. Miller
Atty.

UNITED STATES PATENT OFFICE.

GEORGE W. McFATRICH, OF CHICAGO, ILLINOIS.

EDUCATIONAL OPTICAL INSTRUMENT.

SPECIFICATION forming part of Letters Patent No. 709,792, dated September 23, 1902.

Application filed April 16, 1902. Serial No. 103,174. (No model.)

*To all whom it may concern:*

Be it known that I, GEORGE W. MCFATRICH, a citizen of the United States, residing at Chicago, in the county of Cook and State of Illinois, have invented certain new and useful Improvements in Educational Optical Instruments, of which the following is a specification.

The object of this invention is the production of an optical instrument by means of which the various defects in the human eye—such as myopia, hyperopia, and astigmatism—may be illustrated to the student, the mechanical causes that produce the defect and the resultant image upon the retina of the defective eye being shown.

Figure 1:
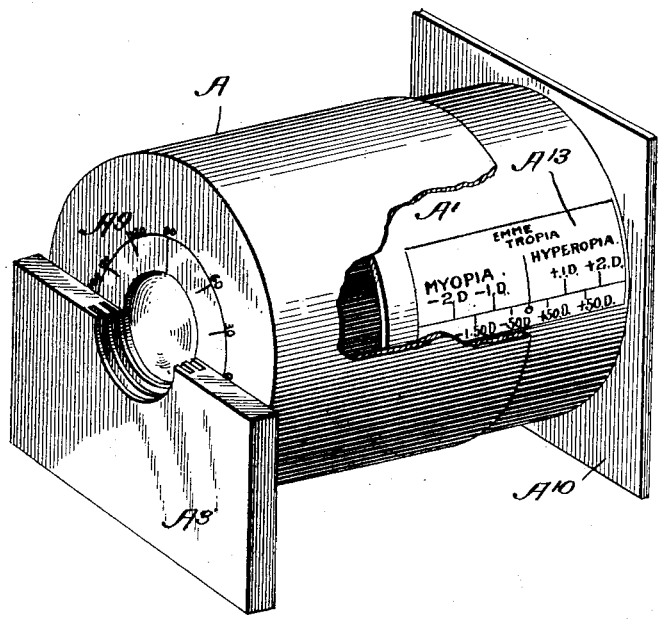
Figure 2:
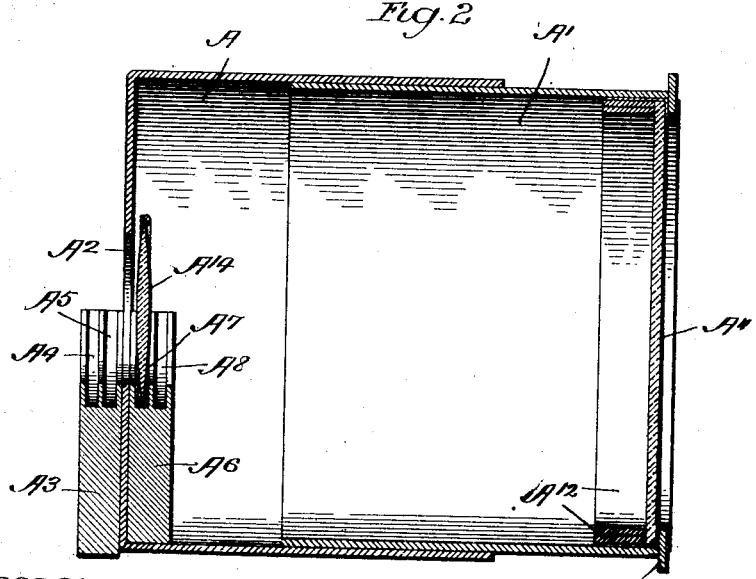
Figure 3:
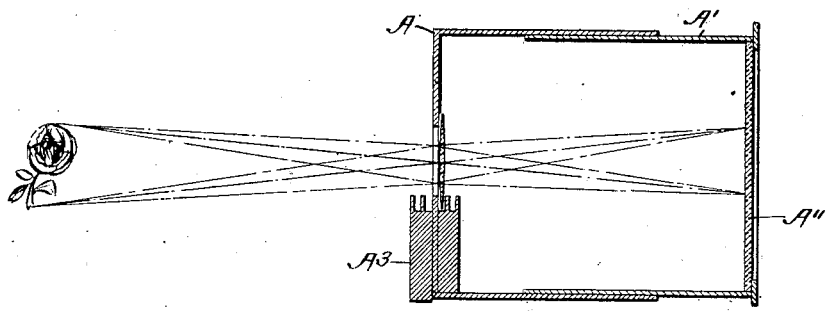
Figure 4:
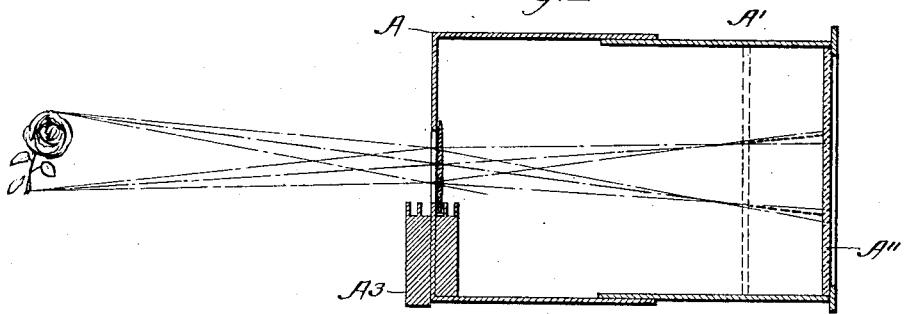
Figure 5:
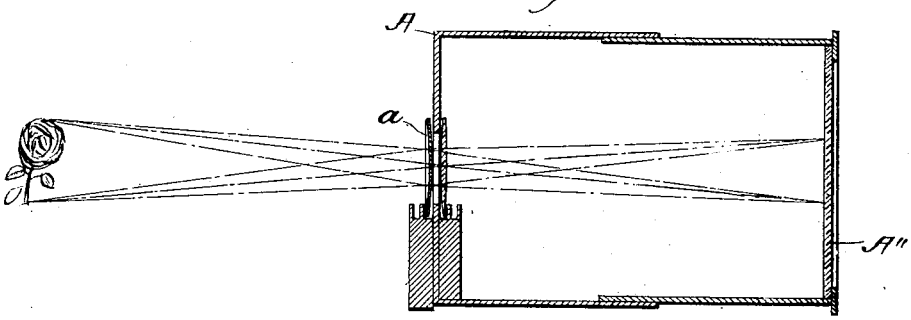
Figure 6:
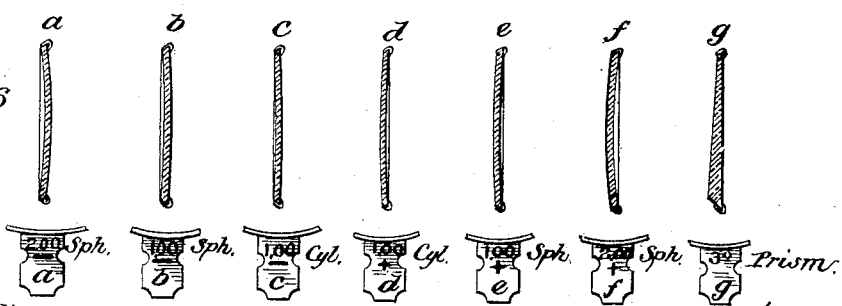

In the accompanying drawings, Figure 1 is a perspective view of this instrument. Fig. 2 is a longitudinal vertical section through said instrument. Fig. 3 is a diagrammatic view showing the instrument set in a position to produce a normal image upon the retina. Fig. 4 is a similar view showing the instrument set to illustrate myopia. Fig. 5 is a view similar to that of the last preceding figure, showing the means for correcting the defect illustrated in Fig. 4. Fig. 6 illustrates the various lenses commonly used in connection with this instrument with a mark upon the handle of each to indicate the character of the lens, those marked $a$, $b$, $e$, and $f$ being spherical, $c$ and $d$ cylindrical, and $g$ a prism.

In the construction of this instrument I provide two cylinders A and A', of pasteboard or other suitable material, the latter being adapted to telescope within the former. The cylinder A is closed at its forward end and is provided with a central pupilary opening $A^2$. A support $A^3$ is secured to the forward end of the cylinder A and is cut away at its upper side at a point corresponding with the opening $A^2$. In its upper edge the support $A^3$ is provided with two cells or pockets $A^4$ and $A^5$ for the reception of lenses, as will more fully hereinafter appear. Within the cylinder A and secured to the inner side of the end wall thereof is a block $A^6$, provided at its upper edge with two lens cells or pockets $A^7$ and $A^8$. Upon the end of the cylinder A and about the pupilary opening $A^2$ therein I provide a semicircular scale $A^9$, marked with one hundred and eighty degrees, the purpose of which scale is to mark the degree of astigmatism indicated by lenses in the objective eye. The cylinder A' is provided at its rear end with a square block $A^{10}$, upon one side of which the rear end of the instrument rests. A ground-glass plate $A^{11}$ fits within the cylinder A', lying against the block $A^{10}$ and being held in position thereon by means of the rings $A^{12}$. A scale $A^{13}$ to indicate the adjustment of the instrument is fixed upon the outer side of the cylinder A'. This scale is provided with a normal or zero mark, and on one side thereof are marked the degrees in diopters of myopia and on the other side the degrees in diopters of hyperopia. A biconvex lens $A^{14}$ of nine diopters is placed in the cell $A^7$ and represents the dioptric media of the eye.

As is well known, the defect of hyperopia, or farsightedness is due to the fact that the retina is too close to the lens of the eye and myopia or nearsightedness to the fact that the retina is too far removed from the lens. Therefore to illustrate a farsighted eye and to exhibit the appearance of the image upon its retina it is only necessary to push the inner cylinder A' within the outer cylinder A to the point upon the scale $A^{13}$ representing hyperopia, and to illustrate the image upon the retina of a nearsighted eye the cylinders should be relatively adjusted with reference to the scale of myopia.

To represent the normal eye, the inner cylinder A' is withdrawn to a point where the zero-mark on the scale $A^{13}$ coincides with the edge of the cylinder A. Objects toward which the instrument is directed will be imaged in an inverted position upon the ground-glass retina $A^{11}$.

In use the biconvex lens $A^{14}$ is placed in the cell $A^7$. When the instrument is adjusted to the zero-mark on the scale $A^{13}$, the rays of light entering the cylinders A and A' through the pupilary opening $A^2$ are thrown by the lens $A^{14}$ upon the ground-glass retina $A^{11}$ at the rear of the instrument. Assuming that it is desirable to illustrate the mechanical defects of a nearsighted eye, the instrument is drawn out until the desired degree of nearsightedness or myopia is obtained, as shown by the scale $A^{13}$. The image upon the retina $A^{11}$ will now be blurred and indistinct, for the reason that the rays of light passing through the lens $A^{14}$ in the pupilary opening $A^2$ are converged at a point somewhat in advance of the retina in its altered position, the rays crossing at the point where the retina should be to receive them and diverging until the retina is reached. The distance rearward that the retina is moved marks a greater degree of defectiveness in the image and illustrates a corresponding degree of shortsightedness in the eye. To correct the mechanical defect illustrated, it is necessary to supply a lens that will spread the rays of light impinging upon the lens $A^{14}$ a distance sufficient to cause said rays to focus upon the retina in its withdrawn position. One of the lenses $-1D$, $-1.5D$, or $-2D$ is used to correct the defect mentioned. If the instrument stands at "$-1D$," (on the scale $A^{13}$,) the spherical lens $b$, Fig. 6, should be inserted in the cell $A^5$, and if the scale indicates "$-2D$" the lens $a$, Fig. 6, should be placed in said cell. The placing of the proper lens before the lens $A^{14}$ corrects the defect and causes a distinct image to be formed upon the retina of the instrument. The pupil by thus manipulating the instrument is taught objectively the mechanical defect that causes myopia and is shown the blurred condition in which objects are seen by the unaided eye of a nearsighted person. The student is also taught what lens to employ to correct the defective condition of the eye and by frequent adjusting and experimentation becomes familiar with the defects and the proper lenses to apply to remedy them.

A farsighted or flattened eye is illustrated by telescoping the cylinders $A$ and $A'$, so that degrees of hyperopia are indicated upon the scale $A^{13}$. If the instrument stands at "$+1D$ hyperopia," the image upon the retina is observed to be blurred and indistinct, caused by the rays of light passing from the object into the instrument and being focused by the lens $A^{14}$ rearward of the retina. Therefore the light coming from each point of the object spreads over a small area of the retina, and light from different points mingles upon the same area of the retina, producing what is termed "diffusion." The correction of this defective condition is to supply a lens that will converge the rays of light upon the lens $A^{14}$ and focus said rays nearer to said lens. The lens $e$ is the proper lens to apply to correct the defective condition illustrated by the instrument in the position mentioned—to wit, "$+1D$ hyperopia"—and when said lens $e$ is inserted in the pocket $A^5$ the image upon the retina becomes clear and distinct.

The cylindrical lenses $c$ and $d$, Fig. 6, are provided to illustrate astigmatic conditions. By placing the $+1D$ cylindrical lens $d$, Fig. 6, in the cell $A^8$ and turning the axis of the lens to one hundred and eighty degrees of the scale $A^9$ the instrument will illustrate the optical conditions of an eye having $1D$ of astigmatism. If the instrument is now set at "$0$" upon the scale $A^{13}$, the horizontal meridian will be emmetropic, but the vertical meridian will be "$1D$ myopia." To correct this condition, insert the $-1D$ cylindrical lens $c$, Fig. 6, in the cell $A^5$ with the axis of the lens at one hundred and eighty degrees upon the scale $A^9$.

Two pockets $A^4$ and $A^5$ are provided in front of the pupilary opening $A^2$, so that a second or supplemental lens may be used to modify or neutralize the effect of the lens in the other pocket.

The three-degree prism-lens $g$, Fig. 6, is applied to illustrate a muscular defect of the eye and the resultant position of an image upon the retina of an eye having such a defect.

The experiments mentioned are given merely as examples of many that will occur to those learned in ophthalmology.

I claim as my invention—

In an educational optical instrument, in combination, a cylinder open at one end and closed at the other save for a pupilary opening; a support for the closed end of said cylinder; two lens-receiving cells and an astigmatic scale of degrees on the exterior of said cylinder adjacent to said pupilary opening; two lens-receiving cells on the interior of said cylinder adjacent to said pupilary opening, a biconvex lens for one of said interior cells; a second cylinder open at one end and at the other end provided with a ground-glass screen and a support for the cylinder, said second cylinder being adapted to telescope with said first-mentioned cylinder; and a scale on one of said cylinders for indicating the relative position of said cylinders.

GEORGE W. McFATRICH.

Witnesses:
OTIS F. HALL,
L. L. MILLER.